United States Patent [19]

Fletcher et al.

[11] 3,911,330

[45] Oct. 7, 1975

[54] NONLINEAR NONSINGULAR FEEDBACK SHIFT REGISTERS

[76] Inventors: James C. Fletcher, Adminstrator of the National Aeronautics and Space Administration, with respect to an invention of Marvin Perlman, Granada Hills, Calif.

[22] Filed: Aug. 27, 1974

[21] Appl. No.: 501,012

[52] U.S. Cl............. 328/37; 307/221 R; 235/92 SH

[51] Int. Cl.$^2$.................. G11C 19/20; H03K 23/00

[58] Field of Search.................. 328/37; 235/92 SH; 307/221 R

[56] References Cited

UNITED STATES PATENTS

| | | | |
|---|---|---|---|
| 3,439,279 | 4/1969 | Guanella | 328/37 |
| 3,535,642 | 10/1970 | Webb | 328/37 |
| 3,718,863 | 2/1973 | Fletcher | 328/27 |
| 3,725,791 | 4/1973 | Moreau et al. | 328/37 |
| 3,816,764 | 6/1974 | King | 328/37 |

*Primary Examiner*—Stanley D. Miller, Jr.
*Attorney, Agent, or Firm*—Monte F. Mott; Paul F. McCaul; John R. Manning

[57] ABSTRACT

Four classes of nonlinear nonsingular feedback shift registers (NLFSR) are disclosed. Each NLFSR, assumed to be $r$ stages long, regardless of its class, generates a feedback sequence of length $2^r$. The sequence is one which cannot be completely deciphered by one not knowing the feedback arrangement, unless at least a very significant portion of the sequence, which is much greater than $2r$-1 successive bits is known. Each NLFSR of either class 1 or class 2 has a feedback arrangement which is a function of a primative polynomial of degree $r$-1. Each register of class 1 includes three nonlinear terms, each one of which is the AND function of a different combination of ($r$-1) outputs of the first ($r$-1) stages. Each register of class 2 includes a single nonlinear term which is the AND function of ($r$-1) outputs of the first ($r$-1) stages. Each NLFSR in class 3 has a feedback arrangement which is based on a primative polynomial of degree $r$-2 and a unique single nonlinear term, while each NLFSR in class 4 has a feedback arrangement which is based on a primitive polynomial of degree $r$-3 and three nonlinear terms.

20 Claims, 15 Drawing Figures

| | | | | |
|---|---|---|---|---|
| 1 | $a_1'$ | $a_2$ | $a_3$ | $a_4$ |
| 2 | $a_1$ | $a_2'$ | $a_3$ | $a_4$ |
| 3 | $a_1$ | $a_2$ | $a_3'$ | $a_4$ |
| 4 | $a_1$ | $a_2$ | $a_3$ | $a_4'$ |
| 5 | $a_1'$ | $a_2'$ | $a_3$ | $a_4$ |
| 6 | $a_1'$ | $a_2$ | $a_3'$ | $a_4$ |
| 7 | $a_1'$ | $a_2$ | $a_3$ | $a_4'$ |
| 8 | $a_1$ | $a_2'$ | $a_3'$ | $a_4$ |
| 9 | $a_1$ | $a_2'$ | $a_3$ | $a_4'$ |
| 10 | $a_1$ | $a_2$ | $a_3'$ | $a_4'$ |
| 11 | $a_1'$ | $a_2'$ | $a_3'$ | $a_4$ |
| 12 | $a_1'$ | $a_2'$ | $a_3$ | $a_4'$ |
| 13 | $a_1'$ | $a_2$ | $a_3'$ | $a_4'$ |
| 14 | $a_1$ | $a_2'$ | $a_3'$ | $a_4'$ |

FIG. 4

$a_k = a_2 + a_4 + a_5$

| | | | | | | $a_k$ |
|---|---|---|---|---|---|---|
| 1 | 0 | 0 | 0 | 0 | 1 | 1 |
| 2 | 1 | 0 | 0 | 0 | 0 | 0 |
| 3 | 0 | 1 | 0 | 0 | 0 | 1 |
| 4 | 1 | 0 | 1 | 0 | 0 | 0 |
| 5 | 0 | 1 | 0 | 1 | 0 | 0 |
| 6 | 0 | 0 | 1 | 0 | 1 | 1 |
| 7 | 1 | 0 | 0 | 1 | 0 | 1 |
| 8 | 1 | 1 | 0 | 0 | 1 | 0 |
| 9 | 0 | 1 | 1 | 0 | 0 | 1 |
| 10 | 1 | 0 | 1 | 1 | 0 | 1 |
| 11 | 1 | 1 | 0 | 1 | 1 | 1 |
| 12 | 1 | 1 | 1 | 0 | 1 | 0 |
| 13 | 0 | 1 | 1 | 1 | 0 | 0 |
| 14 | 0 | 0 | 1 | 1 | 1 | 0 |
| 15 | 0 | 0 | 0 | 1 | 1 | 0 |
| | 0 | 0 | 0 | 0 | 1 | 1 |
| 1 | 1 | 1 | 1 | 1 | 0 | 0 |
| 2 | 0 | 1 | 1 | 1 | 1 | 1 |
| 3 | 1 | 0 | 1 | 1 | 1 | 0 |
| 4 | 0 | 1 | 0 | 1 | 1 | 1 |
| 5 | 1 | 0 | 1 | 0 | 1 | 1 |
| 6 | 1 | 1 | 0 | 1 | 0 | 0 |
| 7 | 0 | 1 | 1 | 0 | 1 | 0 |
| 8 | 0 | 0 | 1 | 1 | 0 | 1 |
| 9 | 1 | 0 | 0 | 1 | 1 | 0 |
| 10 | 0 | 1 | 0 | 0 | 1 | 0 |
| 11 | 0 | 0 | 1 | 0 | 0 | 0 |
| 12 | 0 | 0 | 0 | 1 | 0 | 1 |
| 13 | 1 | 0 | 0 | 0 | 1 | 1 |
| 14 | 1 | 1 | 0 | 0 | 0 | 1 |
| 15 | 1 | 1 | 1 | 0 | 0 | 1 |
| | 1 | 1 | 1 | 1 | 0 | |
| 1 | 0 | 0 | 0 | 0 | 0 | 0 |
| | 0 | 0 | 0 | 0 | 0 | |
| 1 | 1 | 1 | 1 | 1 | 1 | 1 |
| | 1 | 1 | 1 | 1 | 1 | |

FIG. 5b $a_k = a_2 + a_4 + A + B + a'_1 a_2 a_3 a_4 + a_5$

| | | | | | | $a_k$ |
|---|---|---|---|---|---|---|
| 1 | 0 | 0 | 0 | 0 | 0 | 1 |
| 2 | 1 | 0 | 0 | 0 | 0 | 0 |
| 3 | 0 | 1 | 0 | 0 | 0 | 1 |
| 4 | 1 | 0 | 1 | 0 | 0 | 0 |
| 5 | 0 | 1 | 0 | 1 | 0 | 0 |
| 6 | 0 | 0 | 1 | 0 | 1 | 1 |
| 7 | 1 | 0 | 0 | 1 | 0 | 1 |
| 8 | 1 | 1 | 0 | 0 | 1 | 0 |
| 9 | 0 | 1 | 1 | 0 | 0 | 1 |
| 10 | 1 | 0 | 1 | 1 | 0 | 1 |
| 11 | 1 | 1 | 0 | 1 | 1 | 1 |
| 12 | 1 | 1 | 1 | 0 | 1 | 0 |
| 13 | 0 | 1 | 1 | 0 | 1 | 1 |
| 14 | 1 | 0 | 1 | 1 | 1 | 0 |
| 15 | 0 | 1 | 0 | 1 | 1 | 1 |
| 16 | 1 | 0 | 1 | 0 | 1 | 1 |
| 17 | 1 | 1 | 0 | 1 | 0 | 0 |
| 18 | 0 | 1 | 1 | 0 | 1 | 0 |
| 19 | 0 | 0 | 1 | 1 | 0 | 1 |
| 20 | 1 | 0 | 0 | 1 | 1 | 0 |
| 21 | 0 | 1 | 0 | 0 | 1 | 0 |
| 22 | 0 | 0 | 1 | 0 | 0 | 0 |
| 23 | 0 | 0 | 0 | 1 | 0 | 1 |
| 24 | 1 | 0 | 0 | 0 | 1 | 1 |
| 25 | 1 | 1 | 0 | 0 | 0 | 1 |
| 26 | 1 | 1 | 1 | 0 | 0 | 1 |
| 27 | 1 | 1 | 1 | 1 | 0 | 1 |
| 28 | 1 | 1 | 1 | 1 | 1 | 0 |
| 29 | 0 | 1 | 1 | 1 | 1 | 0 |
| 30 | 0 | 0 | 1 | 1 | 1 | 0 |
| 31 | 0 | 0 | 0 | 1 | 1 | 0 |
| 32 | 0 | 0 | 0 | 0 | 1 | 0 |
| | 0 | 0 | 0 | 0 | 0 | 1 |

$a_k = a_2 + a_4 + A + B + a_1 a_2 a_3 a'_4 + a_5$

| | | | | | | $a_k$ |
|---|---|---|---|---|---|---|
| 1 | 0 | 0 | 0 | 0 | 0 | 1 |
| 2 | 1 | 0 | 0 | 0 | 0 | 0 |
| 3 | 0 | 1 | 0 | 0 | 0 | 1 |
| 4 | 1 | 0 | 1 | 0 | 0 | 0 |
| 5 | 0 | 1 | 0 | 1 | 0 | 0 |
| 6 | 0 | 0 | 1 | 0 | 1 | 1 |
| 7 | 1 | 0 | 0 | 1 | 0 | 1 |
| 8 | 1 | 1 | 0 | 0 | 1 | 0 |
| 9 | 0 | 1 | 1 | 0 | 0 | 1 |
| 10 | 1 | 0 | 1 | 1 | 0 | 1 |
| 11 | 1 | 1 | 0 | 1 | 1 | 1 |
| 12 | 1 | 1 | 1 | 0 | 1 | 1 |
| 13 | 1 | 1 | 1 | 1 | 0 | 1 |
| 14 | 1 | 1 | 1 | 1 | 1 | 0 |
| 15 | 0 | 1 | 1 | 1 | 1 | 1 |
| 16 | 1 | 0 | 1 | 1 | 1 | 0 |
| 17 | 0 | 1 | 0 | 1 | 1 | 1 |
| 18 | 1 | 0 | 1 | 0 | 1 | 1 |
| 19 | 1 | 1 | 0 | 1 | 0 | 0 |
| 20 | 0 | 1 | 1 | 0 | 1 | 0 |
| 21 | 0 | 0 | 1 | 1 | 0 | 1 |
| 22 | 1 | 0 | 0 | 1 | 1 | 0 |
| 23 | 0 | 1 | 0 | 0 | 1 | 0 |
| 24 | 0 | 0 | 1 | 0 | 0 | 0 |
| 25 | 0 | 0 | 0 | 1 | 0 | 1 |
| 26 | 1 | 0 | 0 | 0 | 1 | 1 |
| 27 | 1 | 1 | 0 | 0 | 0 | 1 |
| 28 | 1 | 1 | 1 | 0 | 0 | 0 |
| 29 | 0 | 1 | 1 | 1 | 0 | 0 |
| 30 | 0 | 0 | 1 | 1 | 1 | 0 |
| 31 | 0 | 0 | 0 | 1 | 1 | 0 |
| 32 | 0 | 0 | 0 | 0 | 1 | 0 |
| | 0 | 0 | 0 | 0 | 0 | 1 |

FIG. 6b $a_k = a_2' + a_4 + a_5 + a_1 a_2' a_3 a_4'$

| | | | | | $a_k$ |
|---|---|---|---|---|---|
| 0 | 0 | 0 | 0 | 0 | 1 |
| 1 | 0 | 0 | 0 | 0 | 1 |
| 1 | 1 | 0 | 0 | 0 | 0 |
| 0 | 1 | 1 | 0 | 0 | 0 |
| 0 | 0 | 1 | 1 | 0 | 0 |
| 0 | 0 | 0 | 1 | 1 | 1 |
| 1 | 0 | 0 | 0 | 1 | 0 |
| 0 | 1 | 0 | 0 | 0 | 0 |
| 0 | 0 | 1 | 0 | 0 | 1 |
| 0 | 1 | 0 | 1 | 0 | 0 |
| 1 | 1 | 0 | 0 | 1 | 1 |
| 1 | 0 | 1 | 0 | 0 | 0 |
| 0 | 1 | 0 | 1 | 0 | 1 |
| 1 | 0 | 1 | 0 | 1 | 1 |
| 1 | 1 | 0 | 1 | 0 | 1 |
| 1 | 1 | 1 | 0 | 1 | 1 |
| 1 | 1 | 1 | 1 | 0 | 1 |
| 1 | 1 | 1 | 1 | 1 | 0 |
| 0 | 1 | 1 | 1 | 1 | 0 |
| 0 | 0 | 1 | 1 | 1 | 1 |
| 1 | 0 | 0 | 1 | 1 | 1 |
| 1 | 1 | 0 | 0 | 1 | 1 |
| 1 | 1 | 1 | 0 | 0 | 0 |
| 0 | 1 | 1 | 1 | 0 | 1 |
| 1 | 0 | 1 | 1 | 1 | 1 |
| 1 | 1 | 0 | 1 | 1 | 0 |
| 0 | 1 | 1 | 0 | 1 | 1 |
| 1 | 0 | 0 | 1 | 0 | 0 |
| 0 | 1 | 0 | 1 | 1 | 0 |
| 0 | 0 | 1 | 0 | 1 | 0 |
| 0 | 0 | 0 | 1 | 0 | 0 |
| 0 | 0 | 0 | 0 | 1 | 0 |
| 0 | 0 | 0 | 0 | 0 | |

$a_k = a_2' + a_4 + a_5$

| | | | | | $a_k$ |
|---|---|---|---|---|---|
| 0 | 0 | 0 | 0 | 0 | 1 |
| 1 | 0 | 0 | 0 | 0 | 0 |
| 1 | 1 | 0 | 0 | 0 | 0 |
| 0 | 1 | 1 | 0 | 0 | 0 |
| 0 | 0 | 1 | 1 | 0 | 0 |
| 0 | 0 | 0 | 1 | 1 | 1 |
| 1 | 0 | 0 | 0 | 1 | 0 |
| 0 | 1 | 0 | 0 | 0 | 0 |
| 0 | 0 | 1 | 0 | 0 | 1 |
| 1 | 0 | 0 | 1 | 0 | 0 |
| 0 | 1 | 0 | 0 | 1 | 1 |
| 1 | 0 | 1 | 0 | 0 | 0 |
| 1 | 1 | 0 | 1 | 0 | 1 |
| 1 | 1 | 1 | 0 | 1 | 1 |
| 1 | 1 | 1 | 1 | 0 | 1 |
| 1 | 1 | 1 | 1 | 1 | 0 |
| 0 | 1 | 1 | 1 | 1 | 0 |
| 0 | 0 | 1 | 1 | 1 | 1 |
| 1 | 0 | 0 | 1 | 1 | 1 |
| 1 | 1 | 0 | 0 | 0 | 1 |
| 0 | 1 | 1 | 0 | 0 | 0 |
| 0 | 1 | 1 | 1 | 0 | 1 |
| 1 | 0 | 1 | 1 | 1 | 1 |
| 1 | 1 | 0 | 1 | 1 | 0 |
| 0 | 1 | 1 | 0 | 0 | 1 |
| 1 | 0 | 1 | 1 | 0 | 0 |
| 0 | 1 | 0 | 1 | 1 | 0 |
| 0 | 0 | 1 | 0 | 0 | 0 |
| 0 | 0 | 0 | 1 | 0 | 0 |
| 0 | 0 | 0 | 0 | 1 | 0 |
| 0 | 0 | 0 | 0 | 0 | |
| | | | | | |
| 0 | 1 | 0 | 1 | 0 | 1 |
| 1 | 0 | 1 | 0 | 1 | 0 |
| 0 | 1 | 0 | 1 | 0 | |

FIG. 8

$a_k = a_1' + a_2 + A_1 + a_5$ $A_1 = a_1' a_2' a_3 a_4$

| | | | | | | $a_k$ |
|---|---|---|---|---|---|---|
| 1 | 0 | 0 | 0 | 0 | 0 | 1 |
| 2 | 1 | 0 | 0 | 0 | 0 | 0 |
| 3 | 0 | 1 | 0 | 0 | 0 | 0 |
| 4 | 0 | 0 | 1 | 0 | 0 | 1 |
| 5 | 1 | 0 | 0 | 1 | 0 | 0 |
| 6 | 0 | 1 | 0 | 0 | 1 | 1 |
| 7 | 1 | 0 | 1 | 0 | 0 | 0 |
| 8 | 0 | 1 | 0 | 1 | 0 | 0 |
| 9 | 0 | 0 | 1 | 0 | 1 | 0 |
| 10 | 0 | 0 | 0 | 1 | 0 | 1 |
| 11 | 1 | 0 | 0 | 0 | 1 | 1 |
| 12 | 1 | 1 | 0 | 0 | 0 | 1 |
| 13 | 1 | 1 | 1 | 0 | 0 | 1 |
| 14 | 1 | 1 | 1 | 1 | 0 | 1 |
| 15 | 1 | 1 | 1 | 1 | 1 | 0 |
| 16 | 0 | 1 | 1 | 1 | 1 | 1 |
| 17 | 1 | 0 | 1 | 1 | 1 | 1 |
| 18 | 1 | 1 | 0 | 1 | 1 | 0 |
| 19 | 0 | 1 | 1 | 0 | 1 | 1 |
| 20 | 1 | 0 | 1 | 1 | 0 | 0 |
| 21 | 0 | 1 | 0 | 1 | 1 | 1 |
| 22 | 1 | 0 | 1 | 0 | 1 | 1 |
| 23 | 1 | 1 | 0 | 1 | 0 | 1 |
| 24 | 1 | 1 | 1 | 0 | 1 | 0 |
| 25 | 0 | 1 | 1 | 1 | 0 | 0 |
| 26 | 0 | 0 | 1 | 1 | 1 | 1 |
| 27 | 1 | 0 | 0 | 1 | 1 | 1 |
| 28 | 1 | 1 | 0 | 0 | 1 | 0 |
| 29 | 0 | 1 | 1 | 0 | 0 | 0 |
| 30 | 0 | 0 | 1 | 1 | 0 | 0 |
| 31 | 0 | 0 | 0 | 1 | 1 | 0 |
| 32 | 0 | 0 | 0 | 0 | 1 | 0 |
| | 0 | 0 | 0 | 0 | 0 | |

$a_k = a_1' + a_2 + a_5$

| | | | | | | $a_k$ |
|---|---|---|---|---|---|---|
| 1 | 0 | 0 | 0 | 0 | 0 | 1 |
| 2 | 1 | 0 | 0 | 0 | 0 | 0 |
| 3 | 0 | 1 | 0 | 0 | 0 | 0 |
| 4 | 0 | 0 | 1 | 0 | 0 | 1 |
| 5 | 1 | 0 | 0 | 1 | 0 | 0 |
| 6 | 0 | 1 | 0 | 0 | 1 | 1 |
| 7 | 1 | 0 | 1 | 0 | 0 | 0 |
| 8 | 0 | 1 | 0 | 1 | 0 | 0 |
| 9 | 0 | 0 | 1 | 0 | 1 | 0 |
| 10 | 0 | 0 | 0 | 1 | 0 | 1 |
| 11 | 1 | 0 | 0 | 0 | 1 | 1 |
| 12 | 1 | 1 | 0 | 0 | 0 | 1 |
| 13 | 1 | 1 | 1 | 0 | 0 | 1 |
| 14 | 1 | 1 | 1 | 1 | 0 | 1 |
| 15 | 1 | 1 | 1 | 1 | 1 | 0 |
| 16 | 0 | 1 | 1 | 1 | 1 | 1 |
| 17 | 1 | 0 | 1 | 1 | 1 | 1 |
| 18 | 1 | 1 | 0 | 1 | 1 | 0 |
| 19 | 0 | 1 | 1 | 0 | 1 | 1 |
| 20 | 1 | 0 | 1 | 1 | 0 | 0 |
| 21 | 0 | 1 | 0 | 1 | 1 | 1 |
| 22 | 1 | 0 | 1 | 0 | 1 | 1 |
| 23 | 1 | 1 | 0 | 1 | 0 | 1 |
| 24 | 1 | 1 | 1 | 0 | 1 | 0 |
| 25 | 0 | 1 | 1 | 1 | 0 | 0 |
| 26 | 0 | 0 | 1 | 1 | 1 | 0 |
| 27 | 0 | 0 | 0 | 1 | 1 | 0 |
| 28 | 0 | 0 | 0 | 0 | 1 | 0 |
| | 0 | 0 | 0 | 0 | 0 | |
| 1 | 0 | 0 | 1 | 1 | 0 | 1 |
| 2 | 1 | 0 | 0 | 1 | 1 | 1 |
| 3 | 1 | 1 | 0 | 0 | 1 | 0 |
| 4 | 0 | 1 | 1 | 0 | 0 | 0 |
| | 0 | 0 | 1 | 1 | 0 | |

FIG. 9

$$a_k = a_2' + a_3 + a_1' a_2 a_3' a_4 + a_1' a_2' a_3' a_4 + a_1 a_2 a_3 a_4' + a_5$$

| | | | | | | $a_k$ |
|---|---|---|---|---|---|---|
| 1 | 0 | 0 | 0 | 0 | 0 | 1 |
| 2 | 1 | 0 | 0 | 0 | 0 | 1 |
| 3 | 1 | 1 | 0 | 0 | 0 | 0 |
| 4 | 0 | 1 | 1 | 0 | 0 | 1 |
| 5 | 1 | 0 | 1 | 1 | 0 | 0 |
| 6 | 0 | 1 | 0 | 1 | 1 | 0 |
| 7 | 0 | 0 | 1 | 0 | 1 | 1 |
| 8 | 1 | 0 | 0 | 1 | 0 | 1 |
| 9 | 1 | 1 | 0 | 0 | 1 | 1 |
| 10 | 1 | 1 | 1 | 0 | 0 | 0 |
| 11 | 0 | 1 | 1 | 1 | 0 | 1 |
| 12 | 1 | 0 | 1 | 1 | 1 | 1 |
| 13 | 1 | 1 | 0 | 1 | 1 | 1 |
| 14 | 1 | 1 | 1 | 0 | 1 | 1 |
| 15 | 1 | 1 | 1 | 1 | 0 | 1 |
| 16 | 1 | 1 | 1 | 1 | 1 | 0 |
| 17 | 0 | 1 | 1 | 1 | 1 | 0 |
| 18 | 0 | 0 | 1 | 1 | 1 | 1 |
| 19 | 1 | 0 | 0 | 1 | 1 | 0 |
| 20 | 0 | 1 | 0 | 0 | 1 | 1 |
| 21 | 1 | 0 | 1 | 0 | 0 | 0 |
| 22 | 0 | 1 | 0 | 1 | 0 | 1 |
| 23 | 1 | 0 | 1 | 0 | 1 | 1 |
| 24 | 1 | 1 | 0 | 1 | 0 | 0 |
| 25 | 0 | 1 | 1 | 0 | 1 | 0 |
| 26 | 0 | 0 | 1 | 1 | 0 | 0 |
| 27 | 0 | 0 | 0 | 1 | 1 | 1 |
| 28 | 1 | 0 | 0 | 0 | 1 | 0 |
| 29 | 0 | 1 | 0 | 0 | 0 | 0 |
| 30 | 0 | 0 | 1 | 0 | 0 | 0 |
| 31 | 0 | 0 | 0 | 1 | 0 | 0 |
| 32 | 0 | 0 | 0 | 0 | 1 | 0 |
| | 0 | 0 | 0 | 0 | 0 | 1 |

FIG. 11

$$a_k = a_2' + a_3 + a_5$$

| | | | | | | $a_k$ |
|---|---|---|---|---|---|---|
| 1 | 0 | 0 | 0 | 0 | 1 | 0 |
| 2 | 0 | 0 | 0 | 0 | 0 | 1 |
| 3 | 1 | 0 | 0 | 0 | 0 | 0 |
| 4 | 1 | 1 | 0 | 0 | 0 | 0 |
| 5 | 0 | 1 | 1 | 0 | 0 | 1 |
| 6 | 1 | 0 | 1 | 1 | 0 | 0 |
| 7 | 0 | 1 | 0 | 1 | 1 | 1 |
| 8 | 1 | 0 | 1 | 0 | 1 | 1 |
| 9 | 1 | 1 | 0 | 1 | 0 | 0 |
| 10 | 0 | 1 | 1 | 0 | 1 | 0 |
| 11 | 0 | 0 | 1 | 1 | 0 | 0 |
| 12 | 0 | 0 | 0 | 1 | 1 | 0 |
| | 0 | 0 | 0 | 0 | 1 | 0 |

| | | | | | | |
|---|---|---|---|---|---|---|
| 1 | 1 | 1 | 1 | 1 | 0 | 1 |
| 2 | 1 | 1 | 1 | 1 | 1 | 0 |
| 3 | 0 | 1 | 1 | 1 | 1 | 0 |
| 4 | 0 | 0 | 1 | 1 | 1 | 1 |
| 5 | 1 | 0 | 0 | 1 | 1 | 0 |
| 6 | 0 | 1 | 0 | 0 | 1 | 1 |
| 7 | 1 | 0 | 1 | 0 | 0 | 0 |
| 8 | 0 | 1 | 0 | 1 | 0 | 0 |
| 9 | 0 | 0 | 1 | 0 | 1 | 1 |
| 10 | 1 | 0 | 0 | 1 | 0 | 1 |
| 11 | 1 | 1 | 0 | 0 | 1 | 1 |
| 12 | 1 | 1 | 1 | 0 | 0 | 1 |
| | 1 | 1 | 1 | 1 | 0 | 1 |

| | | | | | | |
|---|---|---|---|---|---|---|
| 1 | 0 | 0 | 0 | 1 | 0 | 1 |
| 2 | 1 | 0 | 0 | 0 | 1 | 0 |
| 3 | 0 | 1 | 0 | 0 | 0 | 0 |
| 4 | 0 | 0 | 1 | 0 | 0 | 0 |
| | 0 | 0 | 0 | 1 | 0 | 1 |

| | | | | | | |
|---|---|---|---|---|---|---|
| 1 | 1 | 1 | 1 | 0 | 1 | 0 |
| 2 | 0 | 1 | 1 | 1 | 0 | 1 |
| 3 | 1 | 0 | 1 | 1 | 1 | 1 |
| 4 | 1 | 1 | 0 | 1 | 1 | 1 |
| | 1 | 1 | 1 | 0 | 1 | 0 |

NONLINEAR NONSINGULAR FEEDBACK SHIFT REGISTERS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to feedback shift registers, and more particularly, to four new classes of nonlinear feedback shift registers, each register or r stages generating a single cycle of $2^r$ states.

2. Description of the Prior Art

The construction and use of many types of feedback shift registers (FSRs) are well known. Basically, in a FSR of $r$-stages, the outputs of various stages are combined in a feedback network to generate a feedback bit which is fed back as the input to the first stage. If the individual outputs of the various stages are modulo-2 summed the FSR is referred to as a linear FSR or LFSR. If the output of the last stage is modulo-2 summed with any switching function of one or more of the outputs of the ($r$—1) stages, such as FSR is often referred to as a nonsingular FSR. Generally, to obtain the longest possible cycle (sequence) with an $r$-stage FSR the output of the last stage is modulo-2 summed in the feedback stage. Thus, every LFSR is in fact a linear nonsingular FSR.

When the stages whose outputs are modulo-2 summed are selected as a function of the exponents of a primitive polynomial of degree $r$, two disjoint cycles are generated. One is of length $2^r$—1 and the other is of length 1. Thus, the longest cycle which can be generated with an r-stage LFSR is of length $2^r$—1. The $2^r$—1 successive feedback bits represent a $2^r$—1 PN sequence with noise-like properties. Such sequences have been used for various data transmission applications. It can be shown that even though $2^r$—1 may be made quite long by choosing a large value of $r$, if only a small portion of the long sequence, generated by an LFSR is known the entire sequence can be determined therefrom as well as the feedback arrangement employed to generate the sequence. Generally, if $2r$—1 bits of a sequence of $2^r$—1, generated with a LFSR, are known the entire sequence can be determined.

OBJECTS AND SUMMARY OF THE INVENTION

It is a primary object of the present invention to provide $r$-stage nonlinear nonsingular feedback shift registers, each of which generates a single cycle of $2^r$ states.

Another object of the present invention is to provide four distinct classes of $r$-stage nonlinear nonsingular feedback shift registers, each one of which generates a sequence of $2^r$ bits, the sequence being one which cannot be determined unless a very long portion thereof, significantly greater than $2r$—1 successive bits, are known.

These and other objects of the present invention are achieved by each nonlinear nonsingular feedback shift register, hereinafter defined as NLFSR, which includes a feedback arrangement based on a primitive polynomial of a degree less than $r$ and at least one nonlinear term which is the AND function of $r$—1 outputs of the first ($r$—1) stages of the register, one output per stage. All the NLFSR's in accordance with the present invention, are divided into four classes.

Each NLFSR of either class 1 or class 2 has a feedback arrangement which is a function of a primitive polynominal of degree $r$—1. Each register of class 1 includes three nonlinear terms, each one of which is the AND function of a different combination of ($r$—1) outputs of the first ($r$—1) stages. Each register of class 2 includes a single nonlinear term which is the AND function of ($r$—1) outputs of the first ($r$—1) stages.

Each NLFSR in class 3 has a feedback arrangement which is based on a primitive polynomial of degree $r$—2 and a unique single nonlinear term, whle each NLFSR in class 4 has a feedback arrangement which is based on a primitive polynomial of degree $r$—3 and three nonlinear terms.

Each of the NLFSR's, regardless of its class, generates a feedback sequence of length $2^r$. The sequence is one which cannot be completely deciphered by one not knowing the feedback arrangement, unless at least a very significant portion of the sequence, which is much greater than $2r$—1 successive bits, is known.

The novel features of the invention are set forth with particularity in the appended claims. The invention will best be understood from the following description when read in conjunction with the accompanying drawings.

BRIEF DESCRIPTION OF THE DRAWINGS

FIG. 4 is a list of different inputs for a term C included in the feedback arrangement of a 5-stage NLFSR of class 1 of the present invention;

FIGS. 5*a* and 5*b* are diagrams useful in the explaining a prior art type LFSR of 5 stages;

FIGS. 6*a* and 6*b* are diagrams useful in explaining how the LFSR shown in FIG. 5*a* is converted into a class 1 NLFSR in accordance with the present invention;

FIGS. 7 and 8 are diagrams useful in explaining a class 2 NLFSR;

FIGS. 9 and 10 are diagrams useful in explaining a class 3 NLFSR embodiment;

FIGS. 11 and 12 are diagrams useful in explaining a class 4 NLFSR embodiment.

DESCRIPTION OF THE PREFERRED EMBODIMENTS

Figure 1:
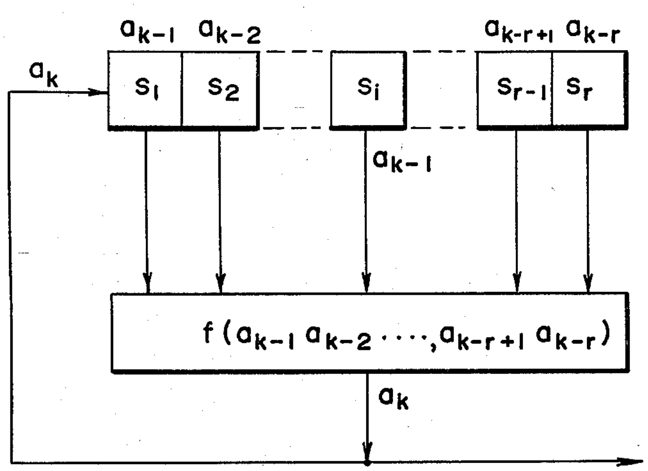
FIG. 1 is a general block diagram of a feedback shift register.

Before proceeding to explain the present invention, a generalized $r$-stage binary feedback shift register will first be discussed. An $r$-stage binary feedback shift register (FSR) in its most general form appears in FIG. 1. The stages are designated $S_1$—$S_r$. The content of the $i^{th}$ stage , $S_i$ at clock pulse interval (CPI) $k$ is denoted by $a_{k-i}$. The bit being fed back at CPI $k$ is denoted by $a_k$ where $$a_k = f(a_{k-1}, a_{k-2}, \ldots a_i \ldots, a_{k-r+1}, a_{k-r}) \quad (1)$$

and $f$ is a switching function of the Boolean variables $$a_{k-1}, a_{k-2}, \ldots, a_{k-r+1}, \text{ and } a_{k-r}.$$

The content of the $i^{th}$ stage at CPI $k$ becomes the content of the $(i+1)^{th}$ stage at CPI $k+1$. That is, $$a_{k-i} = a_{(k+1)-(i+1)} \quad (2)$$

The initial state of the $^{th}$ stage is denoted by $a_{-i}$ (i.e., $k=0$) where $a_o$ denotes the bit being fed back at CPI k=0.

The state of the FSR at CPI $k$ is an r-tuple of binary digits represented by $a_{k-1}a_{k-2} \ldots a_{k-r+1}a_{k-r}$. Distinct states $a_{k-1}a_{k-2} \ldots a_{k-r+1}a_{k-r}$ and $b_{k-1}b_{k-2} \ldots b_{k-r+1}b_{k-r}$ where $a_{k-i}$ $b_{k-i}$ for at least one value of $i$, $i=1, 2, \ldots, r-1, r$ will have distinct successor states if and only if the feedback function is of the following form.

$$f(a_{k-1}, a_{k-2}, \ldots, a_{k-r+1}, a_{k-r}) = F(a_{k-1}, a_{k-2}, \ldots, a_{k-r}) + a_{k-r} \quad (3)$$

where the symbol + denotes the modulo-2 sum, i.e., Exclusive-Or.

Figure 2:
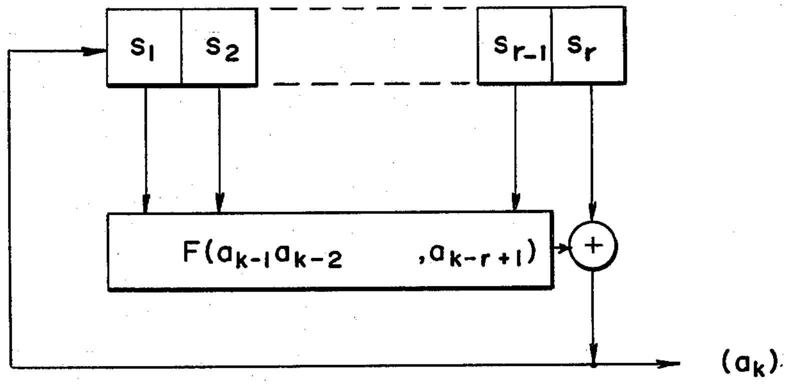
FIG. 2 is a general block diagram of a nonsingular feedback shift register.

The feedback function $f$, in (3) is regarded as nonsingular since it is a function of the modulo-2 summation of the output of the last stage $S_r$, i.e., $a_{k-r}$ and F, where F is an arbitrary switching function of the outputs of one or more of the first $r-1$ stages. A feedback shift register (FSR) having a nonsingular feedback function is termed a nonsingular FSR. A generalized embodiment of such a FSR is shown in FIG. 2. If F is a function of only the Exclusive-Or of various outputs of stages $S_1$-$S_{r-1}$ then the FSR is termed a linear FSR, designated LFSR. Every LFSR is by definition nonsingular. If, however, F includes a term which is a nonlinear switching function of several outputs which is in turn modulo-2 summed with other outputs of stages $S_1$—$S_{r-1}$, then the FSR is termed a nonlinear nonsingular FSR or NLFSR. For example, if $F = a_{k-1} + a_{k-2} + a_{k-1}{}'a_{k-2}$, then F is not linear and therefore the FSR is a NLFSR. The present invention is directed to several classes of NLFSR's.

Before proceeding to describe the invention the above used notations will be simplified for the following discussion. The CPI $k$ will be implied when possible as follows:

$$a_i \rightarrow a_{k-i}$$

That is, the output of stages $S_1$—$S_r$ instead of being denoted as $a_{k-1} \ldots a_{k-r}$ will be denoted as $a_1 \ldots a_r$. However, the feedback bit $a_k$ will be designated as such in order not to confuse it with the letter "$a$". In accordance with the present invention, each stage such as the ith stage, $S_i$ being a binary stage, has an assertion output and a negation output, hereinafter designated $a_i$ and $a_i'$. As is known, the assertion output $a_i$ is high or a 1 when the stage stores a 1 and is low or a 0 when the stage stores a 0. Similarly, the negation output, $a_i'$ is a 1 (or 0) when a 0 (or 1) is stored in stage $S_i$.

Figure 3:
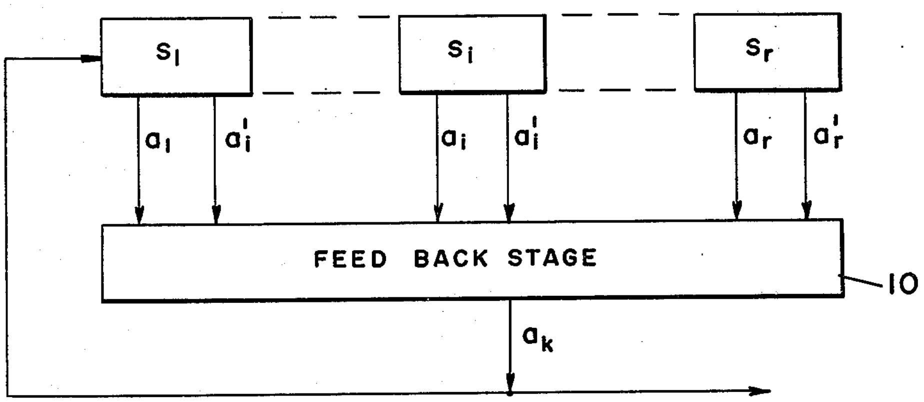
FIG. 3 is a general block diagram of a feedback shift register of the present invention.

FIG. 3 is a generalized block diagram of the NLFSR of the present invention shown consisting of $r$ stages and a feedback stage 10 to which all the assertion and negation outputs of all the stages are shown connected for explanatory purposes. In practice, only selected ones of the outputs are used therein. The output $a_k$ of the feedback stage 10 is fed back to the first stage $S_1$. As is known, when the register is clocked by a clock (not shown) stage $S_1$ stores $a_k$ and each other stage $S_2$ — $S_r$ stores the binary digit or bit previously stored in its preceding stage. In network 10, one of the outputs of the last stage $S_r$ is modulo-2 summed with at least one of the outputs of the first $(r-1)$ stages and with at least one term which is the AND product of one output of each of the $(r-1)$ stages. It is the latter term (or terms) which introduce the nonlinearity in the feedback function and which contribute to the advantages thereof. Basically, the present invention consists of four different classes of NLFSR's. Each NLFSR generally assumed to be of r stages, where $r \geq 5$, is one which generates a single cycle of $2^r$ successive states. The feedback output $a_k$ is thus a sequence of $2^r$ binary digits or bits. Each of the classes of the NLFSR's of the present invention will now be discussed.

CLASS 1

In this class the feedback signal $a_k$ is the modulo-2 summation of the assertion outputs of those stages of the register defined by the characteristic polynomial $$f_o(x) = (1+x)\ \phi_{r-1}(x),$$

where $\phi_{r-1}(x)$ represents a primitive polynomial of degree $r-1$, and 3 additional terms, defined as A, B, C, where $$A = a_1 a_2 \ldots a_{r-1}$$

$$B = a_1{}'a_2{}' \ldots a_{r-1}{}'$$

The term C is the AND product of all the outputs of all the first $(r-1)$ stages, one output per stage, where at least one of the outputs is an assertion output and at least one is a negation output. For a 5-stage register, C can be any of the 14 combinations listed in FIG. 4.

An $r$-stage register with such a feedback arrangement cycles through all the possible $2^r$ stages regardless of its initial stage. Thus, the register output $a_k$ is a sequence of $2^r$ bits. This point will be clearly shown hereinafter. Furthermore, the number of possible sequences which can be generated as $(2^{r-1}-2)$ times the number of primitive polynomials of degree $r-1$. Thus, a very large number of unique sequences, each $2^r$ long, can be generated. As will become apparent from the foregoingn discussion, the nonlinear terms i.e., A, B and C which are modulo-2- summed in the feedback stage 10 cause the disjoined cycles which the $r$-stage register would produce if the feedback function were only that defined by the characteristic polynomial to join into a single cycle of $2^r$ states.

Figure 5A:
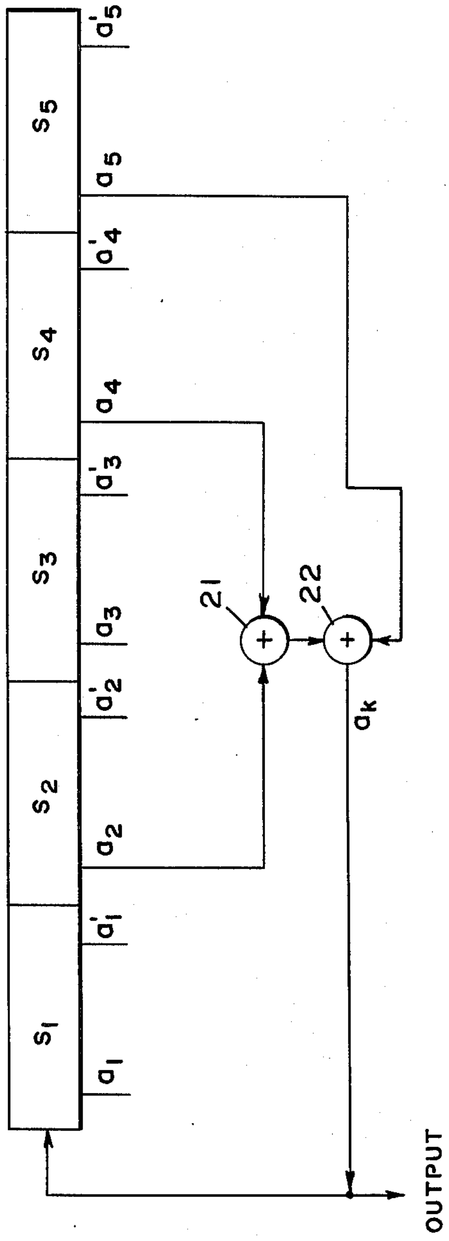
FIG. 5a PRIOR ART

This point may best be explained with specific examples. FIG. 5$a$ is a diagram of $a$ —5 stage ($r=5$) prior art LFSR, whose feedback function is defined by the characteristic polynomial $$f_o(x) = (1+x)(1+x+x^4) = 1+x^2+x^4+x^5$$

where $1+x+x^4$ is a primitive polynomial of degree $5-1=4$. Therefore, $a_k = a_2 + a_4 + a_5$. Numerals 21 and 22 designated modulo-2 summers in the feedback stage 10, with the output of summer 22 representing $a_k$.

When $a_k$ is fed back to $S_1$ the 5-stage register, which is a LFSR, generatess 4 disjointed cycles. Two are associated with complementary sequences each of length $2^{r-1} - 1$, i.e., $2^4 - 1 = 15$ and 2 are isolated 1 state cycles, one of all zeros, 00000, and one of all ones, 11111. Such four cycles are shown in FIG. 5*b*.

Figure 6A:
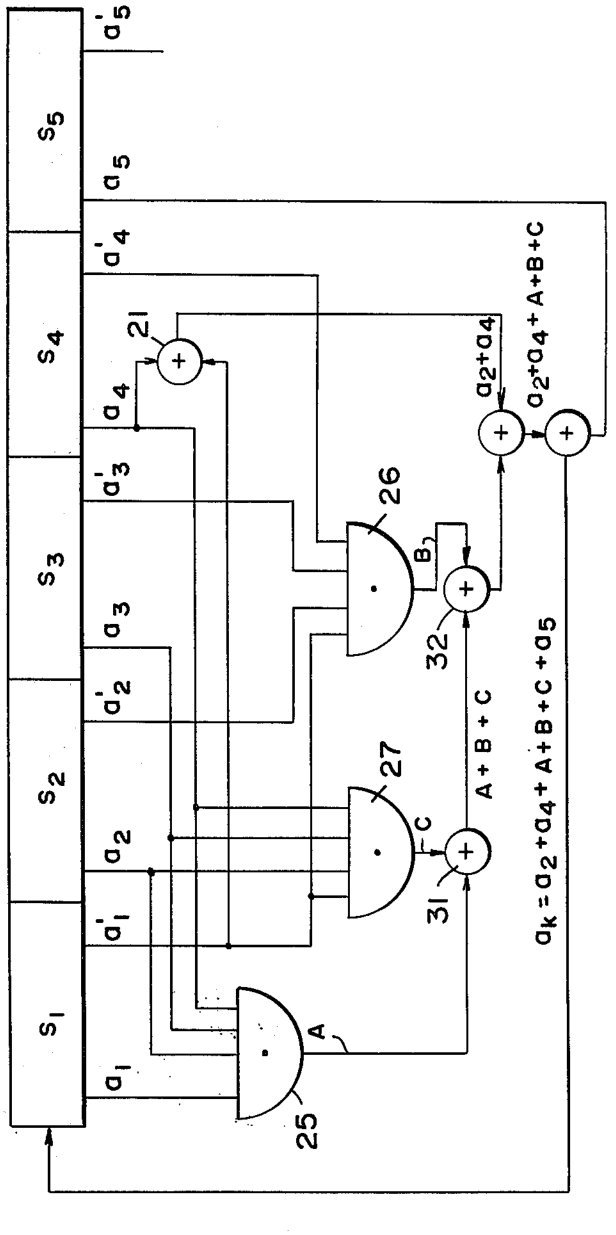

In accordance with the present invention, the prior art LFSR is converted into a NLFSR by including in the feedback network three AND gates which generate the terms A, B and C which are modulo-2 summed with $a_2 + a_4 + a_5$. Such an arrangement is shown in FIG. 6*a*, wherein the three AND gates are designated by numerals 25, 26 and 27. The outputs of gates 25–27 respectively represent A, B and C. In the particular example, $C = a_1' a_2 a_3 a_4$.

In this embodiment, a cycle of length $2^5 = 32$ is generated. Assuming an initial state of all zeros, a complete cycle is shown in the left section of FIG. 6*b*. The 32 bits under the column designated $a_k$ can be used as the register's output.

It should be pointed out that by merely changing the four intputs to gate 27 a different C term is produced, resulting in a different 32-state cycle. For example, with $C = a_1 a_2 a_3 a_4'$, the 32-state cycle and the 32-bit sequence shown on the right section of FIG. 6*b* are produced. Indeed using the same arrangement by merely changing the inputs to gate 27, 14 different sequences can be generated. Clearly, 14 different sequences can be generated for each primitive polynomial of degree $5-1=4$.

It should be apparent that the invention is not limited to a 5-stage register. The number of stages can be any number greater than 4 since for any number of stages of 5 or more there exists primitive polynomials of degree one less than the number of stages. It should further be apparent that the register shown in FIG. 6*a* is non-singular since the output of the last stage, i.e., $a_5$ is effectively mod-2 summed with the term F which in the particular example is equal to $a_2 + a_4 + A + B + C$.

There are several significant advantages which result from the present invention. The first advantage is that with each register of Class 1 a sequence of $2^r$ states or bits can be generated. With prior art registers only a sequence of $2^r - 1$ bits is possible. More importantly, however, the $2^r$ sequence generated by the register in accordance with the invention is such that it is practically impossible to reconstruct the entire sequence and, thereby determine the structure of the register, unless the entire sequence length of $2^r$ states is known. Such a property maybe used to great advantage to produce an encoding sequence or key for enciphering and deciphering data, represented as a sequence of binary digits or bits. If the enciphered data is communicated, it will be secure from use by unauthorized users as long as the entire sequence or key is not shown. This may be illustrated as follows:

| | |
|---|---|
| Data sequence | 0 1 1 0 1 0 1 1 1 1 0 1 1 0 0 |
| Key | 1 1 1 1 0 1 0 1 1 0 0 1 0 0 0 |
| Cipher | 1 0 0 1 1 1 1 0 0 1 0 0 1 0 0 |

The top line represents the data sequence, the middle line the key or encoding sequence and the bottom line the coded or transformed data, referred to as the cipher. The transformation $T_i$ consists of a bit-by-bit modulo-2 sum of the data sequence with the key.

An authorized user would have a priori knowledge of the key and the corresponding inverse transformation, $T_i^{-1}$. Deciphering would proceed as follows:

| | |
|---|---|
| Cipher | 1 0 0 1 1 1 1 0 0 1 0 0 1 0 0 |
| Key | 1 1 1 1 0 1 0 1 1 0 0 1 0 0 0 |
| Data sequence | 0 1 1 0 1 0 1 1 1 1 0 1 1 0 0 |

Actually, decipherment involves an inverse transformation whereby the key is subtracted bit-by-bit modulo 2 from the cipher, yielding the data sequence. Since $-1 \equiv 1$ modulo 2, bit-by-bit modulo 2 subtraction and addition are equivalent. Thus, $T_1^{-1} = T_i$.

When a key possesses randomness properties and its length exceeds the total length of all the data sequences, decipherment without the key is literally impossible. PN sequences such as those shown above length 15, though finite in length have noiselike properties. Such PN sequences are produced by prior art LFSR's as well as by the NLFSR's of the present invention. Thus, they can be used as the key.

One disadvantage of the type of sequences generated with a prior art LFSR is that due to the linearity, if a small portion of the key or sequence is known, the rest of the sequence can be determined therefrom. For example, assume that the PN sequence is generated by an LFSR of 50 stages, i.e., $r=50$ and that the sequence length is $2^{50} - 1$. It can be shown that if at least $2 \cdot 50 - 1 = 100 - 1 = 99$ successive bits of the sequence are known the rest of the sequence can be determined and therefrom the structure of the register. Thus, keys generated with an LFSR are not sufficiently satisfactory to seucre the data from unauthorized use.

However, the sequence generated with any NLFSR of Class 1 in accordance with the present invention, due to the nonlinearity the entire sequence cannot be determined from a short portion thereof. The bits of a relatively long portion of the sequence much much longer than $2r-1$ must be known to determine the register structure. If $r$ is made relatively large, even with a high clocking rate, the sequence can be made so long that its cmoplete generation takes many years, thus, making key breaking practically impossible. For example, with $r=50$ with the present invention, a sequence of $2^{50} = 10^{16}$ can be generated. Assuming a clocking rate of 1 MHz it would take more than 30 years to generate the entire sequence.

These advantages are possessed by sequences which can be generated by any of the registers following within Class 1 or by any register in any of the following classes of NLFSR's in accordance with this invention.

CLASS 2

Consider an $r$-stage FSR with a feedback function represented by $$f_1(x) = (1+x) f_o(x) \text{ where } f_o(x) = (1+x)\, \phi_{r-1}(x)$$

In the above expression $f_o(x)$ designates the assertion outputs of the stages which are to be fed back and modulo-2 summed and the term $(1+x)$ in $f_1(x)$ indicates that the feedback bit is the complement of the modulo-2 summation of the outputs defined by $f_o(x)$. Such a register is a LFSR which generates two disjointed cycles, one of length $2^r-2$ and the other of length 2. In accordance with the present invention a nonlinear term defined as $A_1$ is included in the feedback function to convert the register into a NLFSR which generates a single cycle of $2^r$ states. The term $A_1$ is the AND product of the outputs of the first $(r-1)$ stages, one output per stage, with every other output being the assertion output and every other output is the negation output. Thus, $A_1$ can be defined as follows:

$$A_1 = a_1 a_2' a_3 a_4' a_5 \ldots$$

or $$A_1 = a_1' a_2 a_3' a_4 a_5' \ldots$$

The differences between a conventional LFSR and the NLFSR of the present invention can best be explained in connection with the following examples together with FIGS. 7 and 8. Let $r=5$ and $\phi_{r-1}(x) = + x + x^4$. Thus, $$f_o(x) = (1+x)(1+x+x^4) = 1 + x^2 + x^4 + x^5$$

Therefore, the feedback bit $\hat{a}_k$ is defined by $f_o(x)$ as $\hat{a}_k = a_2 + a_4 + a_5$ and its complement can be expressed as $$a_k = \mathbf{1} + a_2 + a_4 + a_5$$

where the term 1 indicates a constant of 1 which is modulo-2 summed with $a_2 + a_4 + a_5$. The same can be accomplished by taking the negation output of one of the three stages $S_2$, $S_4$ or $S_5$. Thus, $a_k$ can be rewritten as $$a_k = a_2' + a_4 + a_5 = a_2 + a_4' + a_5 = a_2 + a_4 + a_5'$$

In the following example, it is assumed that $a_k = a_2' a_4 + a_5$. With such a feedback bit the register is a LFSR and it will produce 2 cycles as shown in the right section of FIG. 8. However, in accordance with the present invention the LFSR is converted into a NLFSR with a feedback bit defined as $$a_k = a_2' + a_4 + A_1 + a_5$$

Figure 7:
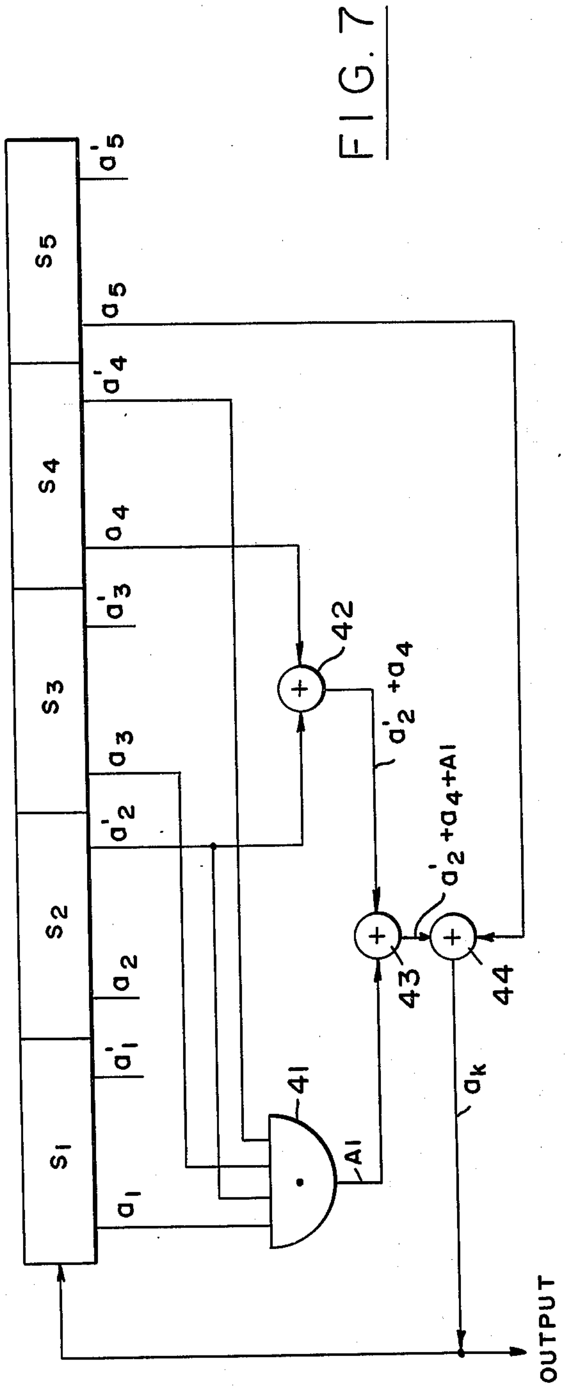

FIG. 7 shows a register with such a feedback arrangement. AND gate 41 provides the term $A_1$ which in the particular example $A_1 = a_1 a_2' a_3 a_4'$ and numerals 42–44 designate three modulo-2 summers which modulo-2 sum the four terms $a_2'$, $a_4$, $A_1$ and $a_5$ which define $a_k$. The register with such a feedback arrangement is a NLFSR which generates a single cycle of $2^r = 2^5 = 32$ states, as shown in the left section of FIG. 8.

It should be apparent that instead of output $a_1$, $a_2'$, $a_3$ and $a_4'$ outputs $a_1'$, $a_2$, $a_3'$ and $a_4$ may be supplied to gate 41. In such a case a different $2^5$ length sequence will be produced. Thus, in this class for each primitive polynomial of degree $r-1$, two different sequences may be generated. The total number of sequences for this class is two times the number of primitive polynomials of degree $(r-1)$.

CLASS 3

An $r$-stage LFSR associated with the characteristic polynomial $f_1(x) = (1+x)\,[(1+x)^2\,\phi_{r-2}(x)\,] = (1+x)\,f_o(x)$ where $f_o(x) = (1+x)^2\,\phi_{r-2}(x)$, generates two disjoint cycles. In the above expression, $\phi_{r-2}(x)$, in $f_o(x)$ represents a primitive polynomial of degree $r-2$. The expression $f_o(x)$ designates the outputs of the stages which are fed back in $f_1(x)$. The term $(1+x)$ factor of $f_1(x)$ indicates that the feedback signal is the complement of the mod-2 sum of the assertion outputs of the stages defined by $f_o(x)$. The two disjoint cycles are of lengths $2^r-4$ and 4.

In accordance with this invention such an LFSR is converted into a NLFSR producing a single cycle of length $2^r$ by the modulo-2 addition of the term defined herein as $A_2$ where $$A_2 = a_1^{\alpha_1}\ a_2^{\alpha_2}\ a_3^{\alpha_3}\ \ldots\ a_{r-1}^{\alpha_{r-1}}$$

In the above expression for $A_2$, $\alpha_1\ \alpha_2 \ldots \alpha_{r-1}$ is any one of four of the following $r-1$ tuples:

0011 . . . 0011 . . .
1001 . . . 1001 . . .
1100 . . . 1100 . . .
0110 . . . 0110 . . .

where *a* 0 indicates a negation output and *a* 1 an assertion output.

Thus, the four possible expressions for $A_2$ are as follows:

$A_2 = a_1' a_2' a_3 a_4 a_5' a_6'\ a_7 \ldots$
$A_2 = a_1 a_2' a_3' a_4 a_5 a_6' a_7' \ldots$
$A_2 = a_1 a_2 a_3' a_4' a_5 a_6 a_7' \ldots$
$A_2 = a_1' a_2 a_3 a_4' a_5' a_6 a_7 \ldots$ Clearly, the number of outputs which are ANDed together to form $A_2$ depends on $r$ and is always $(r-1)$. For each primitive polynomial of degree $r-2$, four different NLFSR's can be produced by merely changing the outputs which form the term $A_2$.

This point can again best be explained in connection with a specific example, where $r=5$. let $\phi_{r-2} = 1+x+x^3$. Thus, $$f_o(x) = (1+x)^2\,(1+x+x^3) = 1+x+x^2+x_5$$

This indicates that the assertion outputs of stages $S_1$, $S_2$ and $S_5$ should be fed back and mod-2 summed. To feed back the signal $a_k$ in accordance with $f_1(x)$ the complement of this modulo-2 sum is required. Thus, $a_k$ can be made equal to $$a_k = \mathbf{1} + a_1 + a_2 + a_5.$$

Also, the complementing may be achieved by modulo-2 summing the negation output of one of stages $S_1$, $S_2$ and $S_5$ with the assertion outputs of the other two stages. For example, $a_k = a_1' + a_2 + a_5$ With such a feedback signal two cycles are generated as shown in the right section of FIG. 9. However, if the $A_2$ is modulo-2 summed with $a_1' + a_2 + a_5$ a single cycle of $2^5$ states is produced. Let $A_2 = a_1' a_2' a_3 a_4$. Therefore $$a_k = a_1' + a_2 + a_1' a_2' a_3 a_4 + a_5$$

The length 32 cycle for an all zero initial state is shown in the left section of FIG. 9.

Figure 10:
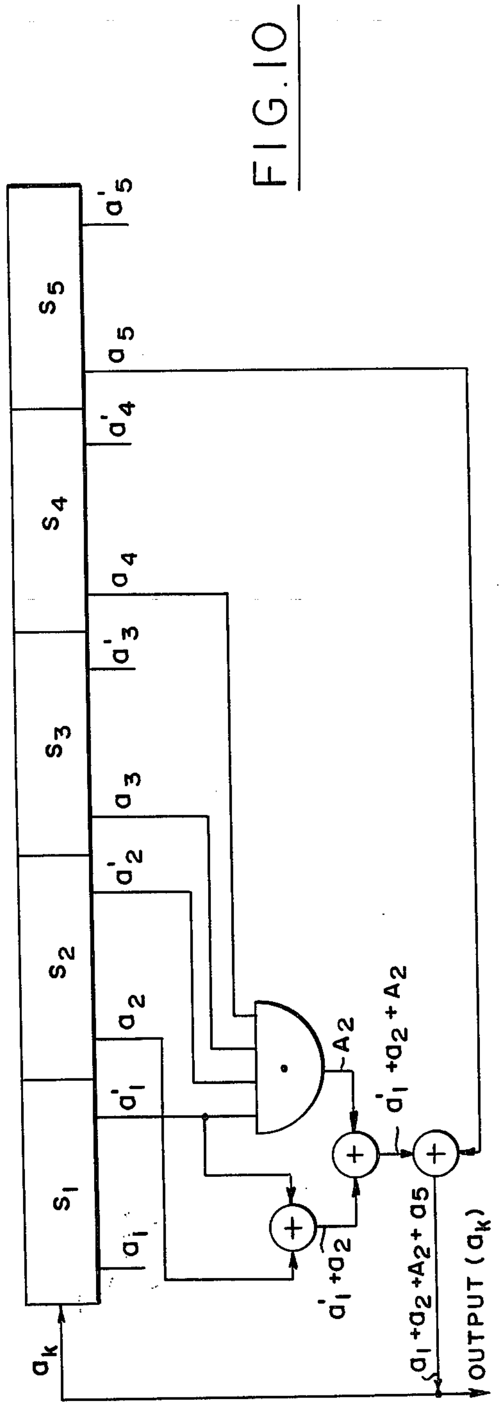

An example of a NLFSR with such a feedback arrangement is shown in FIG. 10 where AND gate 51 generates $A_2$. The single cycle generated with such a feedback arrangement is shown in the left section of FIG. 9 for an initial state of all zero. Clearly, if $A_2$ were chosen to be any one of the following $A_2 = a_1 a_2' a_3' a_4$
$A_2 = a_1 a_2 a_3' a_4'$
$A_2 = a_1' a_2 a_3 a_4'$ Three different cycles are generated even though $a_1' + a_2 + a_5$ is not changed. Thus, the number or $r$-stage NLFSR's included in this class is 4 times the number of primitive polynomials of degree r-2.

CLASS 4

Class 4 is similar to Class 3 except that in the latter the feedback function of an $r$-stage register is a function of the primitive polynomial of degree $r-3$. Let $f_1(x) = (1+x)\,f_o(x)$ where $f_o(x) = (1+x)^3\ \phi_{r-3}(x)$ In the above expressions $\phi_{r-3}(x)$ indicates a primitive polynomial of degree $r$—3, and the expression $(1+x)$ in $f_1(x)$ indicates that $f_1(x)$ is associated with $a_k$, is the complement of $\hat{a}_k$ associated with $f_o(x)$. Such a feedback function when associated with an $r$-stage LFSR generates two pairs of complementary cycles. One pair is of length $2^{r-1} - 4$ and the other pair has a length 4. For example, for $r$=5 and $\phi_{r-3}(x) = 1 + x + x^2$ $$f_o(x) = (1+x)^3\ (1+x+x^2) = 1 + x^2 + x^3 + x^5$$

Thus, $a_k = 1 + a_2 + a_3 + a_5$.

By taking the negation output of any of the three stages, $S_2$, $S_3$ or $S_5$ the constant term 1 can be deleted. Thus, $a_k$ can be rewritten as $$a_k = a_2' + a_3 + a_5$$

It can be easily shown that with such a feedback arrangement four disjointed cycles are generated as shown in the right section of FIG. 11. In accordance with the present invention, the four cycles can be joined into a single cycle of $2^r$ states by modulo-2 adding to the linear feedback function the following three terms.

$A_3 = a_1^{\beta_1}\quad a_2^{\beta_1}\quad a_3^{\beta_1}\ \ldots\ a_{r-1}^{\beta_{r-1}}$ $A_4 = a_1^{\sigma_1}\quad a_2^{\sigma_2}\quad a_3^{\sigma_3}\ \ldots\ a_{r-1}^{\sigma_{r-1}}$ and $A_5 = a_1^{\delta_1}\quad a_2^{\delta_2}\quad a_3^{\delta_3}\ \ldots\ a_{r-1}^{\delta_{r-1}}$ where the $r$—1 tuples $\beta_1\beta_2\beta_3 \ldots \beta_{r-1}$, $\sigma_1\sigma_2\sigma_3 \ldots \sigma_{r-1}$ and $\delta_1\delta_2\delta_3 \ldots \delta_{r-1}$ are independently selected from the states.

| $\beta_1$ | $\beta_2$ | $\beta_3$ | $\beta_4$ | $\beta_5$ | ... | $\sigma_1$ | $\sigma_2$ | $\sigma_3$ | $\sigma_4$ | $\sigma_5$ | ... | $\delta_1$ | $\delta_2$ | $\delta_3$ | $\delta_4$ | $\delta_5$ | ... |
|---|---|---|---|---|---|---|---|---|---|---|---|---|---|---|---|---|---|
| 0 | 1 | 0 | 1 | 0 | ... | 0 | 0 | 0 | 1 | 0 | ... | 1 | 1 | 1 | 0 | 1 | ... |
| 1 | 0 | 1 | 0 | 1 | ... | 1 | 0 | 0 | 0 | 1 | ... | 0 | 1 | 1 | 1 | 0 | ... |
| | | | | | | 0 | 1 | 0 | 0 | 0 | ... | 1 | 0 | 1 | 1 | 1 | ... |
| | | | | | | 0 | 0 | 1 | 0 | 0 | ... | 1 | 1 | 0 | 1 | 1 | ... |

From the possible combinations of $\beta_1$, $\beta_2$ etc., up to $\beta_{r-1}$ it is seen that $A_3$ is the AND function in which every other input is an assertion output of a stage of the $r$—1 stage and every other input is a negation output. If the negation output of S1 is chosen, i.e., $a_1'$, then the assertion output $a_2$ of S2 is chosen. On the other hand, if $a_1$ is chosen, as one of the inputs, then $a_2'$ is chosen as one of the other inputs.

As to the possible combinations of $\sigma_1$, $\sigma_2$ through $\sigma_{r-1}$, they can be thought of as groups of three negation outputs followed by an assertion output, where the output of S1 can be any one of the four in the group. As shown above in order, the output of S1 can be the negation output followed by the negation outputs of S2 and S3 and assertion output of S4, etc., or it can be the assertion output followed by three negation outputs of S2, S3, S4. Likewise, the output of S1 can be the last negation output in the group of four followed by the assertion output of S2 the negation outputs of S3, S4, S5, etc. The output of S1 can also be the middle negation output of the group followed by the negation, assertion and three negation outputs of S2, S3, and S4–S5, etc., (assuming that $r$ is not less than 6).

As to $\delta_1$, $\delta_2$. . . $\delta_{r-1}$, they indicate successive groups up to $r$—1, each group of three successive assertion outputs followed by a negation output. Again, the output of S1 can be chosen to represent any one of the four positions in the group. That is, the output of S1 can be the assertion output followed by two assertion outputs in which case it is the first assertion of the three; by one assertion output in which case it is the middle assertion output of the three or by a negation output in which case it is the third assertion output of the three. The output of S1 can also be the negation output in the group followed by three assertion outputs, Assuming a 5-stage register and assuming that the first $r$—1 types chosen for each of $\beta - \delta$ are $A_3 = a_1'a_2a_3'a_4$ $A_4 = a_1'a_2'a_3a_4'$ and $A_5 = a_1a_2a_3a_4'$ and further assuming the previous linear feedback function when the two sets of terms are modulo-2 summed so that $$a_k = a_2' + a_3 + A_3 + A_4 + A_5 + a_5$$

a NLFSR is produced which generates a single unique $2^r = 2^5 = 32$ state cycles, as represented in the left hand section.

Figure 12:
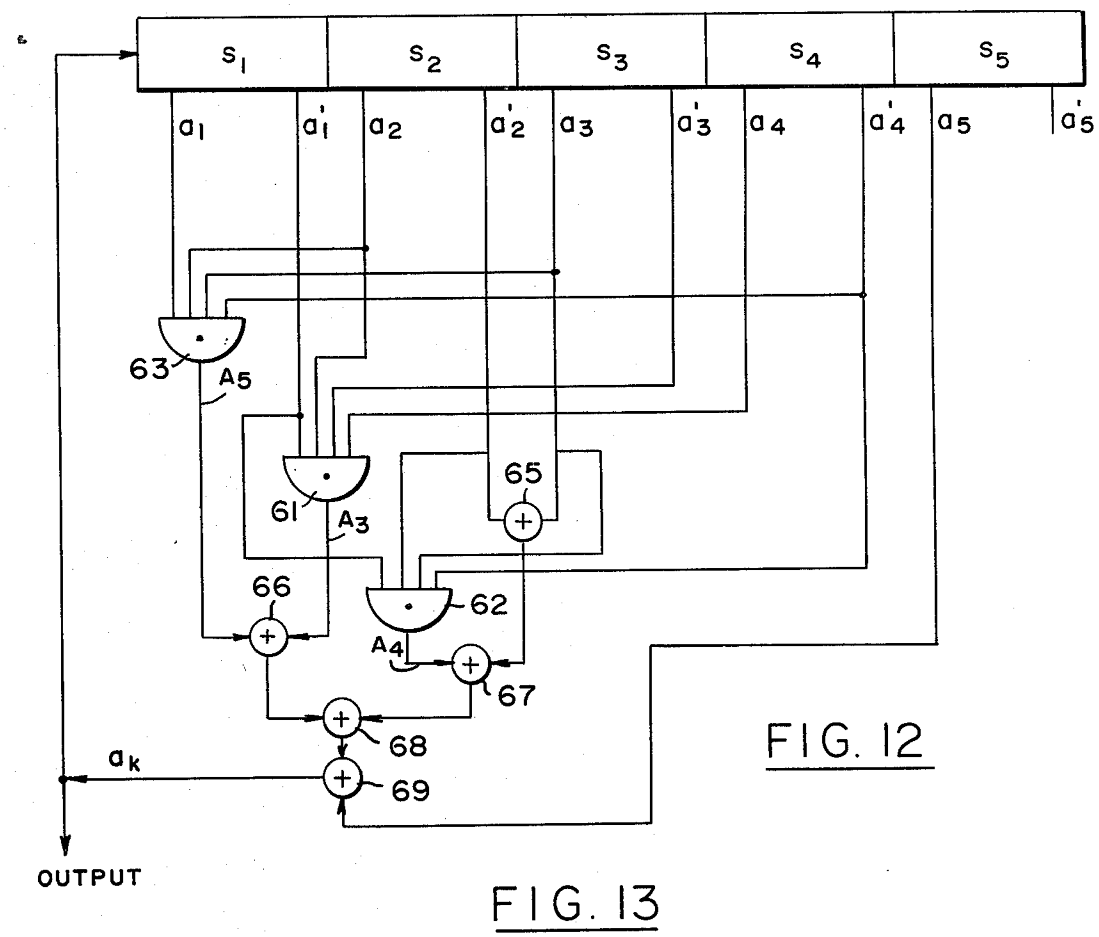

FIG. 12 is a diagram of a 5-stage register with such a feedback arrangement. AND gates 61–63 produce $A_3$–$A_5$ respectively and modulo-2 address 65–69 perform the modulo-2 addition of the 6 terms needed to produce $a_k$.

It should be apparent that there are 32 different combinations of outputs of the stages to generate $A_3$–$A_5$. Thus, for each primitive polynomial of degree $r$—3, up to 32 different $2^r$ cycles can be generated.

SUMMARY

In accordance with the present invention four classes of NLFSR's are provided. Each register assumed to be r-stages long where $r \geq 5$ produces a sequence of $2^r$ states. The feedback function of each register includes at least one nonlinear term. In each register of Class 1 the feedback bit is a function of the assertion outputs of stages defined by the exponents of the terms of the characteristics polynomial $f_o(x) = (1+x)\phi_{r-1}(x)$ which are modulo-2 summed together with three nonlinear terms defined as A, B, and C. The term $\phi_{r-1}(x)$ represents a primitive polynomial of degree $r$—1 and the term A is the AND function of the assertion outputs of all the first ($r$—1) stages. The term B is the AND function of the negation outputs of all the first ($r$—1) stages and the term C is the AND function of the outputs of all the ($r$—1) stages with at least one output being an assertion output and one output being a negation output.

In each register of Class 2 the feedback function is the complement of the modulo-2 sum of the assertion outputs of stages defined by the exponents of the terms of the characteristic polynomial $f_o(x) = (1+x)\ \phi_{r-1}(x)$, modulo-2 summed with a nonlinear term $A_1$. The term $A_1$ is the AND function of the outputs of the first $r$—1 stages, where every other output is an assertion output and every other output is a negation output.

Each register in Class 3 has a feedback function which is the complement of the modulo-2 sxum of the assertion outputs of stages defined by the exponents of the terms of a characteristic polynomial $f_o(x) = (1+x)^2\ \phi_{r-2}(x)$, modulo-2 summed with a nonlinear term defined as $A_2$. The term $\phi_{r-2}(x)$ designates a primitive polynomial of degree $r$—2. The term $A_2$ is the AND function of the $r$—1 outputs of the first $r$—1 stages, one output per stage. Regarding the first $r$—1 stages as arranged in a sequence from 1 to $r$—1, $A_2$ may be the AND function of opposite outputs of successive pairs of stages.

For example, $A_2$ may be the AND function of the assertion (or negation) outputs of the first two stages followed by the negation (or assertion) outputs of the next two stages, followed by the assertion (or negation) outputs of the next pair of stages, etc. Also, $A_2$ may be the AND function of the assertion (or negation) output of the first stage $S_1$ followed by opposite outputs of each pair of successive stages.

In each register of Class 4 the feedback bit is a function of the complement of the modulo-2 summation of the assertion outputs of stages defined by the exponents of the terms in the characteristic polynomial $$f_o(x) = (1+x)^3 \, \phi_{r-3}(x),$$

modulo-2 summed with three nonlinear terms defined as $A_3$, $A_4$ and $A_5$. $A_3$ is the AND function of the outputs of the first $r-1$ stages where every other output is a negation output and every other output is an assertion output. $A_4$ is the AND function of the outputs of all the first $r-1$ stages in which the output of the first stage may be the negation output followed by an assertion output and, thereafter, repeatedly followed by three negation and one assertion output up to $(r-1)$ outputs. $A_4$ may also be the AND function of the negation output of the first stage followed by the assertion output of the second stage and thereafter repeatedly followed by three negation outputs and one assertion output. $A_4$ may also be the AND function of the assertion output of the first stage followed repeatedly by three negation outputs and one assertion output. $A_4$ may also be the AND function of the negation outputs of the first two stages followed repeatedly by an assertion output and three successive negation outputs. Generally, $A_4$ is the AND function of successive groups of outputs each group of three negation outputs and one assertion output, and the output of S1 may be any one of the four in the basic group.

$A_5$ like $A_3$ and $A_4$ is the AND function of $(r-1)$ outputs of the first $(r-1)$ stages, one output per stage. Basically, these outputs are a repeating succession of three assertion outputs followed by a negation output. The output of the first stage may be the first assertion output of the first group of three assertion outputs, or the negation output preceding the first group of three successive assertion outputs. The outputs of the first two stages may be the assertion and negation outputs preceding the first group of three successive assertion outputs or the outputs of the first three stages may be the assertion, assertion and negation outputs followed by the first group of three successive assertion outputs. Generally, $A_5$ is the AND function of successive groups of outputs, each group being of three assertion outputs and one negation output, and the output of the first stage S1 may be any one of the four in the basic group.

Each of the NLFSR's in accordance with the present invention generates a single cycle of $2^r$ states. Thus, its output is a sequence of $2^r$ bits. Due to the fact that such a sequence is generated with at least one nonlinear term it practically is impossible to determine the feedback arrangement generating the sequence unless at least a very long portion of the sequence is known.

Although hereinbefore the various classes of NLFSR's have been described in connection with 5-stage NLFSR's the invention is not limited to $r=5$. The number of stages r may be any integer greater than 4. As is appreciated, the number of primitive polynomials grows as r grows. For example, assuming a register of $r=24$, there are 356,960 primitive polynomials for degree $r-1=23$.

For example, $1 + x^2 + x^3 + x^4 + x^8$ is a primitive polynomial of degree 8. Thus, it can be used to form a 9-stage NLFSR in either Class 1 or 2, a 10-stage NLFSR of Class 3 or a 11-stage NLFSR of Class 4. Similarly, $1+x^9+x^{49}$ is a primitive polynomial of degree 49. Thus, it can be used to form NLFSR's or 50, 51 and 52 stages.

The following is an example of deriving a 50-stage NLFSR of Class 2. Let, $$f_o(x) = (1+x)\,(1+x^9+x^{49}) = 1+x+x^9+x^{10}+x^{40}+x^{50}$$

Thus, $$f_1(x) = (1+x)\,(1+x^9+x^{10}+x^{49}+x^{50})$$

where $(1+x)$ indicates that $f_1(x)$ is the complement of $f_o(x)$. Therefore, for a LFSR $$\begin{aligned} a_k &= 1 + a_1 + a_9 + a_{10} + a_{49} + a_{50} \\ &= a_1' + a_9 + a_{10} + a_{49} + a_{50} \end{aligned}$$

However, for a NLFSR in accordance with the present invention $$a_k = a_1' + a_9 + a_{10} + a_{49} + A_1 + a_{50},$$

where $A_1$ may be expressed as $$A_1 = a_1a_2'a_3a_4'a_5a_6'a_7a_8'a_9a_{10}' \ldots a_{48}'a_{49}$$

or $$A_1 = a_1'a_2a_3' \ldots a_8a_9'a_{10}a_{11}' \ldots a_{48}a_{49}'$$

Figure 13:
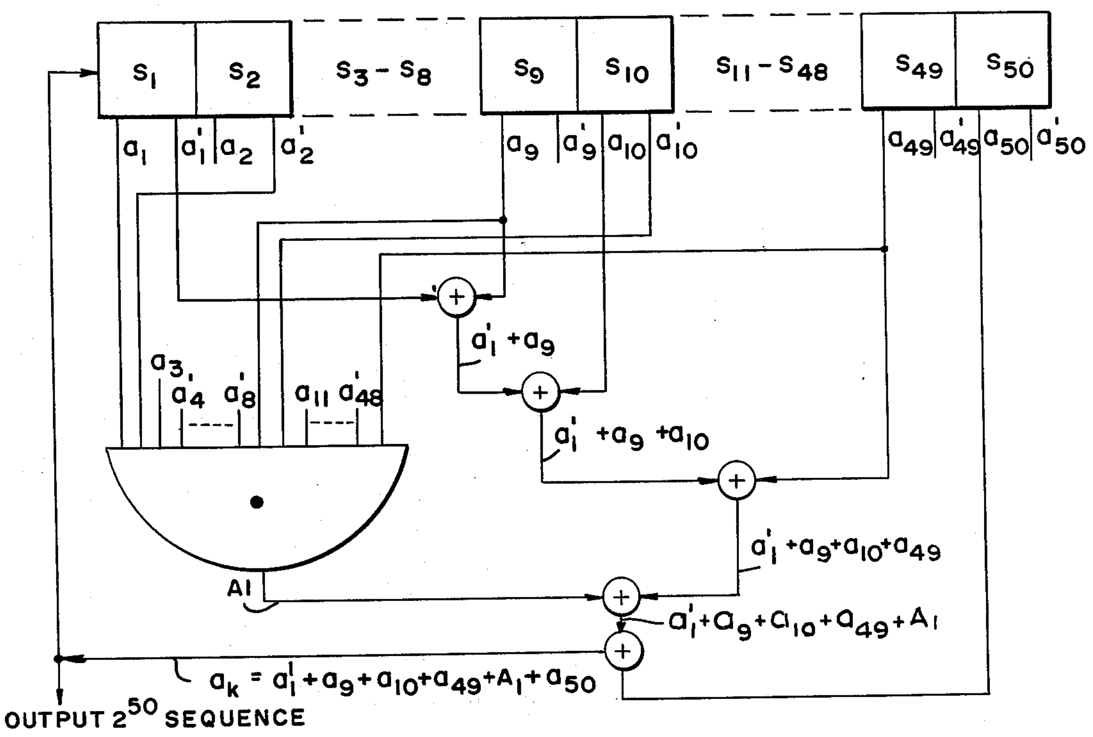
FIG. 13 is a diagram of one embodiment of a 50-stage NLFSR of class 2.

One embodiment of such a 50-stage NLFSR is shown in FIG. 13. Therein, and gate 75 with 49 inputs generates $A_1$. Fed to gate 49 are the assertion outputs of all the oddnumbered stages of the first 49 stages and the negation outputs of the even-numbered stages except the last. A different $2^{50}$ state sequence can be generated by supplying to gate 75 the negation outputs of the odd-numbered stages and the assertion outputs of all the even-numbered stages, except the last stage $S_{50}$.

Hereinbefore, only exclusive-OR gates were shown in each feedback stage or network to generate the feedback bit $a_k$ which is the exclusive-OR function of varous outputs of the register stages and at least one AND gate. It should be appreciated that the time required to generate the feedback bit may be optimized by arranging the gates in different operational levels. Also, the feedback bit $a_k$ may be generated by logic elements other than exclusive-OR gates. For example, in the embodiment shown in FIG. 7, $$a_k = A_1 + a_2' + a_4 + a_5,$$

where $A_1 = a_1a_2'a_3a_4'$
It can be shown that $$\begin{aligned} a_k &= A_1 + a_2' + a_4 + a_5 \\ &= A_1'a_2'a_4'a_5' \ v\ A_1'a_2'a_4a_5 \ v\ A_1'a_2a_4'a_5 \\ &\quad v\ A_1'a_2a_4a_5' \ v\ A_1a_2'a_4'a_5 \ v\ A_1a_2'a_4a_5' \\ &\quad v\ A_1a_2a_4'a_5' \ v\ A_1a_2a_4a_5. \end{aligned}$$

where $v$ denotes a logical OR, and where $A_1'$ is the complement of $A_1$. Thus, the feedback bit $a_k$ can be generated with eight 4-input AND gates and one 8-input OR gate in addition to gate 41 and an additional inverter to provide $A_1'$. Therefore, the term modulo-2 summing means as used herein, is intended to include any logic means not limited to exclusive-OR gates capable of providing an output such as the feedback bit $a_k$ which is the modulo-2 sum of certain outputs of register stages or AND gates.

Although particular embodiments of the invention have been described and illustrated herein, it is recognized that modifications and variations may readily occur to those skilled in the art and consequently, it is intended that the claims be interpreted to cover such moficiations and equivalents.

What is claimed is:

1. An $r$-stage nonlinear nonsingular feedback shift register comprising:

a binary shift register of $r$ stages, arranged in a sequence from 1 to r where $r \geq 5$, each stage having an assertion output which is at an enabling level when the state is at a first binary level definable as a 1, and a negation output which is at an enabling level when the stage is at a second binary level, definable as a 0;

feedback means including a first AND gate for providing an output which is the AND function of the assertion outputs of all the first ($r$—1) stages, a second AND gate for providing an output which is the AND function of the negation outputs of all the first ($r$—1) stages, a third AND gate for providing an output which is the AND function of the outputs of the first ($r$—1) stages, one output per stage, where at least one output is an assertion output and at least one output is a negation output, and modulo-2 summing means for providing a feedback output which is the modulo-2 sum of the outputs of said first through third AND gates and the assertion outputs of stages defined by the exponents of terms in a characteristic polynomial $f_o(x)\ \phi_{r-1}(x)$, where $\phi_{r-1}(x)$ represents a primitive polynomial of degree $r$—1; and means for feeding back said feedback output to said first stage.

2. An $r$-stage nonlinear nonsingular feedback shift register comprising:

a binary shift register of $r$ stages, arranged in a sequence from 1 to $r$, where $r \geq 5$, each stage having an assertion output which is at an enabling level when the state is at a first binary level, definable as a 1, and a negation output which is at an enabling level when the stage is at a second binary level, definable as a 0;

feedback means including a single AND gate for providing an output which is the AND function of the outputs of said ($r$—1) stages, one output from each stage, where the type of output of each stage following the first stage is opposite the type of output of the preceding stage, and modulo-2 summing means for providing a feedback output which is the modulo-2 sum of the oeutput of said AND gate and the complement of the modulo-2 sum of the assertion outputs of stages defined by the exponents of a characteristic polynomial $f_o(x) = (1+x)\ \phi_{r-1}(x)$, where $\phi_{r-1}(x)$ is a primitive polynomial of degree $r$—1; and means for feeding back said feedback output to said first stage.

3. The shift register as described in Claim 2 wherein the output of the AND gate is a function of the assertion outputs of all the odd-numbered stages of said ($r-1$) stages and the negation outputs of all the even-numbered stages of said ($r-1$) stages.

4. The shift register as described in claim 2 wherein the output of the AND gate is a function of the negation outputs of all the odd-numered stages of said ($r$—1) stages and the assertion outputs of all the even-numbeered stages of said ($r$—1) stages.

5. An $r$-stage nonlinear nonsingular feedback shift register comprising:

a binary shift register of r stages, arranged in a sequence from 1 to $r$, where $r \geq 5$, each stage having an assertion output which is at an enabling level when the state is at a first binary level, definable as a 1, and a negation output which is at an enabling level when the stage is at a second binary level, definable as a 0;

feedback means including an AND gate for providing an output which is the AND function of outputs of the first ($r$—1) stages, one output per stage, the outputs being alternating pairs of assertion and negation outputs, with the output of the first stage being a negation output followed by the negation output of the second stage and thereafter by alternating pairs of assertion and negation outputs up to ($r$—1) outputs, or the output of the first stage being an assertion output followed by alternating pairs of negation and assertion outputs up to ($r$—1) outputs, or the outputs of the first two stages being the assertion outputs followed by alternating pairs of negation and assertion outputs up to ($r$—1) outputs, or the first stage output is the negation output followed by alternating pairs of assertion and negation outputs up to ($r$—1) outputs, and modulo-2 summing means for modulo-2 summing the AND gate output and selected outputs of said states to provide a feedback output which is the complement of the modulo-2 sum of said AND gate output and assertion outputs of stages defined by the exponents of terms of a characteristic polynomial, definablle as $f_o(x) = (1+x)^2\ \phi_{r-2}(x)$, where $\phi_{r-2}(x)$ is a primitive polynomial of degree $r$—2.

6. The shift register as described in claim 5 wherein the AND gate output is a function of the negation output of said first stage.

7. The shift register as described in claim 6 wherein the AND gate output is a function of the negation outputs of said first and second stages followed by alternating pairs of assertion and negation outputs up to ($r$—1) outputs.

8. The shift register as described in claim 6 wherein the AND gate output is a function of the negation output of the first stage followed by alternating pairs of assertion and negation outputs up to ($r$—1) outputs.

9. The shift register as described in claim 5 wherein the AND gate output is a function of the assertion output of said first stage.

10. The shift register as described in claim 9 wherein the AND gate output is a function of the assertion output of said first stage followed by alternating pairs of negation and assertion outputs up to ($r$—1) outputs.

11. The shift register as described in claim 9 wherein the AND gate output is a function of the assertion outputs of the first two stages, followed by alternating pairs of negation and assertion outputs up to $(r-1)$ outputs.

12. An $r$-stage nonlinear nonsingular feedback shift register comprising:

a binary shift register of $r$ stages, arranged in a sequence from 1 to $r$ where $r \geq 5$, each stage having an assertion output which is at an enabling level when the state is at a first binary level, definable as a 1, and a negation output which is at an enabling level when the stage is at a second binary level, definable as a 0;

feedback means including first, second and third AND gates each responsive to a different combination of $(r-1)$ outputs, one from each of the first $(r-1)$ stages, for providing an output which the AND function of the output supplied thereto, said first AND gate being responsive to a succession of $(r-1)$ outputs in which every other output is an assertion output and every other output is a negation output, with the output of the first stage being either an assertion output or a negation output, said second AND gate being responsive to a succession of $(r-1)$ outputs in which groups of three negation outputs followed by a single assertion output are repeated successively, with the output of the first stage being any of the three negation outputs or the assertion output, said third AND gate being responsive to a succession of $(r-1)$ outputs in which groups of three assertion outputs followed by a single negation output are repeated successively, with the output of the first stage being any one of the three assertion outputs or the negation output, and modulo- 2 summing means for providing a feedback output which is the complement of the modulo-2 sum of the outputs of said first, second and third gates and the assertion outputs of stages defined by the exponents of the terms of a characteristic polynomial $f_o(x) = (1+x)^3\phi_{r-3}(x)$ where $\phi_{r-3}(x)$ defines a primitive polynomial of degree $r-3$; and means for feeding back said feedback output to the first stage of said register.

13. The shift register as described in claim 12 wherein said modulo-2 summing means are responsive to one output of each of the stages defined by the exponents of the terms of said characteristic polynomial, all of the outputs of the defined stages being assertion outputs except one which is the negation output.

14. The shift register as described in claim 13 wherein each of said first, second and third gates is responsive to the negation output of said first stage.

15. The shift register as described in claim 13 wherein each of said first, second and third AND gates is responsive to the assertion output of said first stage.

16. The shift register as described in claim 12 wherein said first AND gate is responsive to the assertion output and at least said second or said third AND gate is responsive to a negation output of said first stage.

17. The shift register as described in claim 16 wherein said second AND gate is responsive to the negation output of said first stage.

18. The shift register as described in claim 16 wherein said third AND gate is responsive to the negation output of said first stage.

19. The shift register as described in claim 12 wherein said first AND gate is responsive to the negation output of said first stge and at least said second or said third gate is responsive to the assertion output of said first stage.

20. The shift register as described in claim 19 wherein each of said second and third AND gates is responsive to the assertion output of said first stage.

* * * * *